Sept. 26, 1933.   H. E. RENARD   1,928,031
MANUFACTURE OF FILMS
Filed Sept. 24, 1930   2 Sheets-Sheet 2
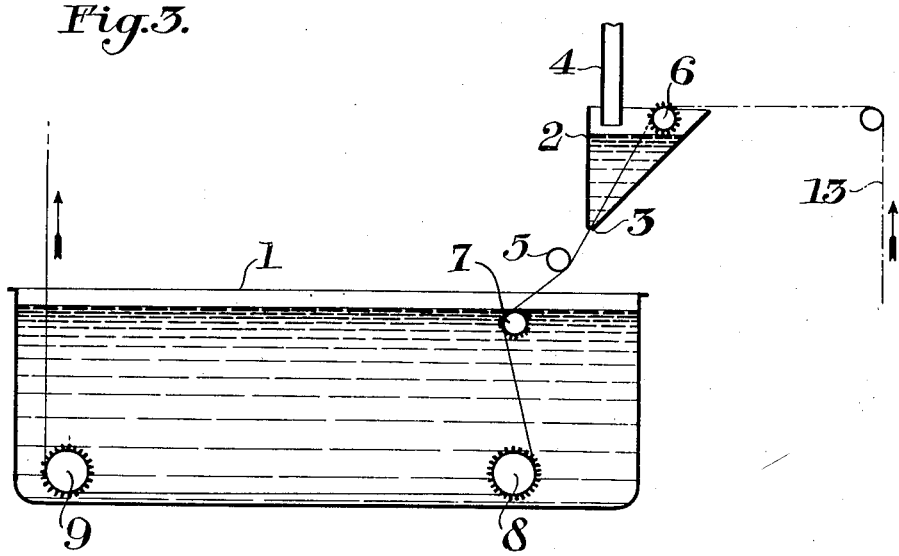
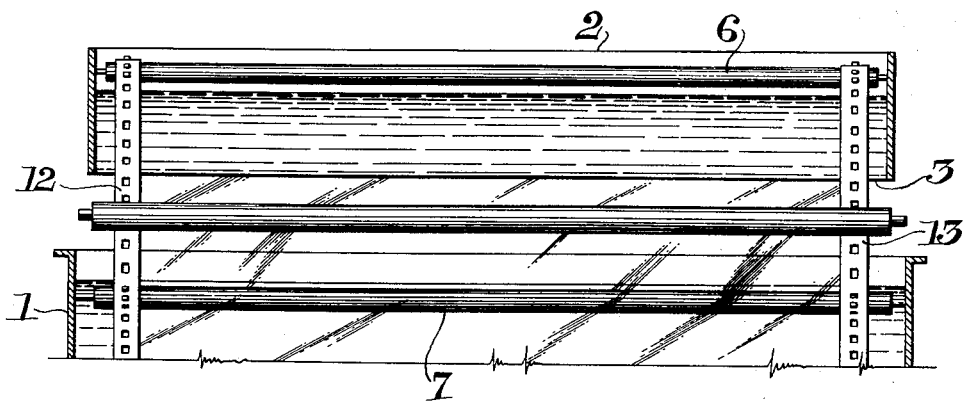
Inventor
Henri E. Renard,
By
Daniel J. Mayne
Attorneys.

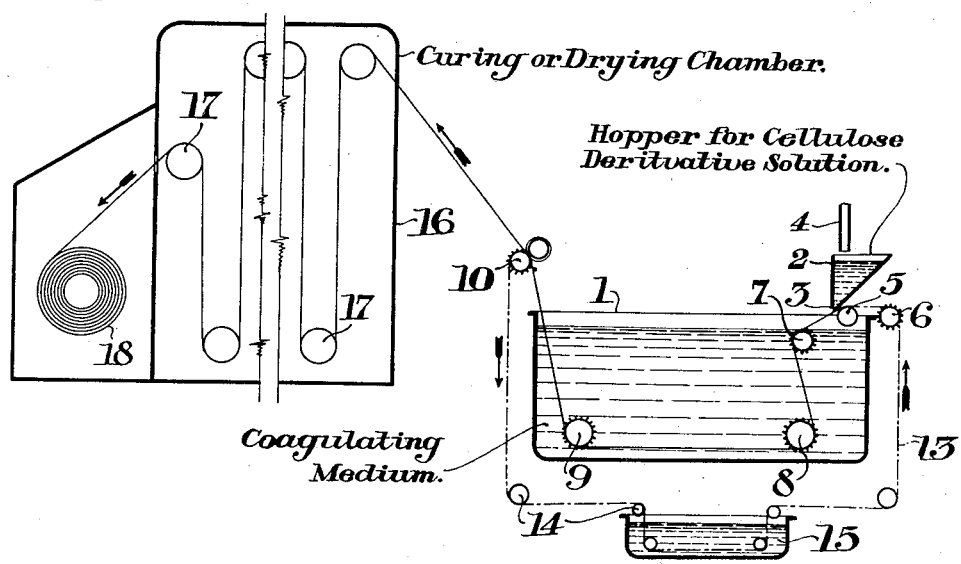
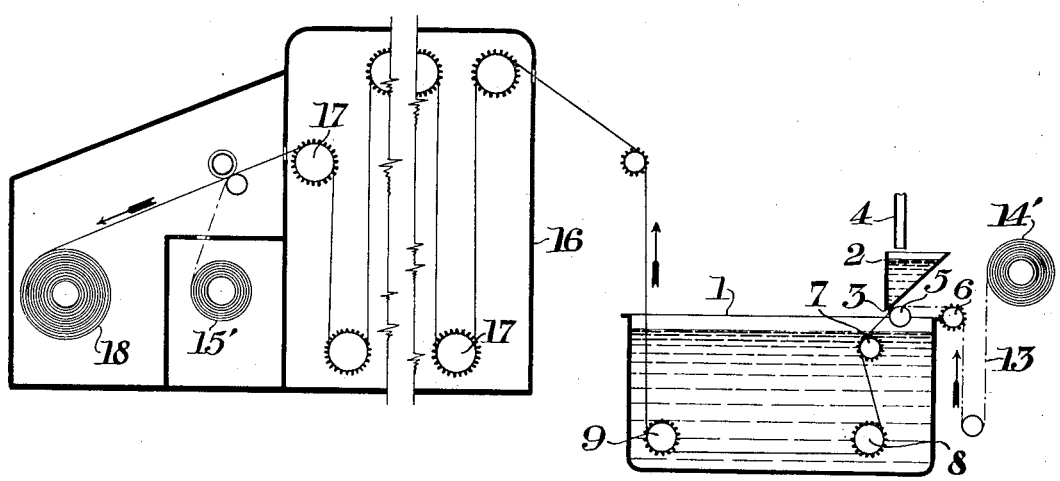

Patented Sept. 26, 1933

1,928,031

UNITED STATES PATENT OFFICE 1,928,031

MANUFACTURE OF FILMS

Henri Edouard Renard, Fontenay-sous-Boise, France, assignor to Eastman Kodak Company, Rochester, N. Y., a corporation of New York Application September 24, 1930
Serial No. 484,223

7 Claims. (Cl. 18—57)

This invention relates to the continuous manufacture of films comprised of cellulose derivatives, and more particularly to an improvement in the method of manufacture by means of coagulation, in which no supporting surface is used during the coagulation.

According to the general principle of this method, the cellulose solution in the form of collodion flows through an opening in a funnel or nozzle into the coagulating bath as a sheet which gradually solidifies and forms a film: this latter, after a certain lapse of time in the bath is led on to a take-up device which passes it towards the centrifugal, drying or other arrangements for treating it.

Now when this method is used it is noticed that during the coagulation phase, the sheet of collodion does not coagulate instantly throughout its entire mass. The coagulation commences at the outer surface and proceeds towards the interior of the mass in proportion to and as fast as the solvents are eliminated. As soon as this elimination commences a skin is formed over the surface of the collodion, the bulk of the interior of the mass remaining still as a solution. In proportion to and at the rate with which the coagulation proceeds by the continued elimination of the solvents the bulk of the interior of the sheet of collodion decreases in volume; since the film is neither supported nor stretched across its width, it contracts and there is produced on the skin-surface, wrinkles or folds running in a longitudinal direction. These wrinkles or folds remain in the finished film and it is impossible to obliterate them afterwards. This contraction across the width is generally called "coagulation shrinkage."

Moreover, owing to the tension produced (on the take-up device) there is produced a more or less elongation of the film as well as a shrinkage across the width; this shrinkage can be termed "the transverse shrinkage due to tension."

This transverse shrinkage due to stretching takes place in addition to the shrinkage due to coagulation, and both components, in view of the wrinkles or folds which they produce, constitute a serious manufacturing fault in film. This is particularly serious in the case of cinematograph film which should be properly transparent and smooth. If the films are made thicker this fault is accentuated because of the greater quantity of solvent which has to be eliminated, consequently there is an increased contraction of the material.

One object of the present invention is an improved method of manufacture characterized in that the sheet of collodion is submitted, during the formation of the film, and particularly before it solidifies, to a tension across its width so as to avoid the formation of the wrinkles or folds.

According to my proposed method of carrying out the invention, this transverse tension on the film is provided by means of a support consisting for example of bands of cloth or other material which are maintained at a suitable distance apart and which are placed for example, one on each edge of the sheet of collodion to which they adhere, being amalgamated therewith, and which accompany the sheet of colloidon through the bath and guide it to the take-up device.

These bands, which cannot stretch as the film coagulates, therefore take the whole of the driving tension. On the other hand as a result of the separation of the supporting bands, the sheet of collodion which is amalgamated on to these bands is prevented from contracting across its width and the coagulation results in a smooth film without any wrinkles or folds.

The reinforcing bands are brought into contact with the sheet of collodion at a convenient moment to give sufficient adherence therewith. The actual contact can take place either within the nozzle or just where the sheet of collodion leaves the nozzle. The bands can be pulled along with the whole of the coagulated film by means of the driving device itself or any other arrangement employing either friction or pressure or by a frame or chain, or by means of perforations engaging in the teeth of a roller.

The bands may be removed if desired from the film as soon as the coagulation is complete. They can be detached, for example, at the driving roller, by a slitting operation. They may be returned to the point of contact with the film so as to form an endless band, or they may be rolled up as desired. They can, moreover, be removed at a still later stage, as for example, after the drying or at the end of the various operations to which the film is subjected.

The width of the bands can be varied according to the width of the sheet of collodion and the nature of material used for their construction. The cloth or other material used for these bands should be such that they knit easily with the sheet of collodion and will not come apart during the coagulation. It is preferable to choose a material which is permeable to the liquid of the coagulation bath, so that the action of the bath can take place on the portion of the sheet which adheres to the band.

The accompanying drawings illustrate in a diagrammatic fashion various apparatus of my invention with which my novel method of producing film may be carried out. In the drawings in which like reference characters indicate like parts;

Fig. I is an elevation of one form of apparatus for coagulating film in accordance with my invention;

Fig. II is an elevation of a different form of apparatus;

Fig. III is a detail side elevation of a modification in hopper design, and

Fig. IV is a front sectional elevation of the same.

A tank 1 is provided for containing the coagulating vats. Above one end of the tank is positioned transversely thereof a hopper 2 which has a narrow slotted outlet 3 at the lower side thereof and a supply inlet 4. A smooth idle roll 5 is located adjacent to the outlet 3 and toothed rolls 6, 7, 8, 9, and 10 are positioned adjacent to or in the tank 1. The teeth upon the rolls 6, 7, 8, 9, and 10 are located at the ends of the rolls as shown more clearly in Fig. 4. The length of all of the rolls mentioned is slightly longer than the slot 3 which in turn is of a length approximately equal to the width of the film desired to be produced. The teeth upon the rolls 6, 7, 8, 9, and 10 are placed at a distance apart which is slightly less than the width of the film.

Over the rolls 5, 6, 7, 8, 9, and 10 pass two spaced narrow bands 12 and 13 each provided with longitudinally spaced perforations which fit the teeth of the rolls 6, 7, 8, 9, and 10. These bands may be continuous as shown in Fig. I where they pass over idle rolls 14 and through a tank 15 of cleaning fluid (if desired) or the bands may be discontinuous and unrolled and rolled as at 14' and 15', respectively. In the case of either apparatus the film passes through a curing or drying chamber 16 provided with rolls 17 and from thence to the film windup 18. Spaced cutters 19 are provided and so spaced as to sever the film at the point where it joins the bands 12 and 13 so as to give a sheet of film free from any mechanical defects. The portion of the film which adheres to the bands 12 and 13 is stripped therefrom so that the bands may be reused.

In the case of the modification shown in Figs. 3 and 4 the bands 12 and 13 pass through the hopper 3 and slot 2 so that the film envelopes the bands rather than being deposited upon the bands as in Figs. 1 and 2.

The operation of the apparatus and method is doubtless already apparent but will be described to make sure that it is understood. It may be assumed that the bands 12 and 13 are traveling through the tank 1 containing a suitable coagulating liquid and that the hopper 2 is maintained full of a suitable cellulose derivative film forming dope the composition of which is well known to those skilled in the art. The slot 2 is of course, adjustable and is adjusted to deposit a film of the desired thickness. Inasmuch as the sprockets upon the rolls 6, 7, 8, 9, and 10 and 17 are all spaced an identical distance apart the bands 12 and 13 will travel at an equal distance apart throughout the formation and treatment of the film. As the film flows from the slot 3 of the hopper 2 it is deposited upon and adheres to the bands 12 and 13. The film then passes through the coagulating vats in tank 1 wherein the film congeals. It next passes through the curing or drying chamber 16 to the wind-up 18.

By virtue of the fact that the bands 12 and 13 are substantially unstretchable in a longitudinal tension and because the bands 12 and 13 are positively spaced in a lateral direction the film will not be permitted to shrink in a lateral direction, during the travel of the film through the process. A film without wrinkles and buckles will thus be obtained.

It is to be understood that the invention is not limited to the method described, and our invention is intended to include any method or apparatus which effect in any other way the transverse pull on the sheet of collodion or similar substance and on the film in order to prevent the transverse shrinkage thereof. Also in the foregoing and in the claims it will be understood that the term film refers to a sheet of cellulose derivative, or in other words to film base or support, as distinguished from finished photographic film bearing a layer of light sensitive emulsion.

What I claim as my invention and desire to be secured by Letters Patent of the U. S. is:

1. The method of producing a sheet or film which comprises depositing a cellulose derivative solution in a continuous thin sheet, subjecting the sheet to the action of the coagulating medium, and maintaining the original width of the sheet by securing it against transverse shrinkage during coagulation.

2. The method of producing a sheet or film which comprises depositing a cellulose derivative solution in a continuous thin sheet on a support, subjecting the sheet to the action of a coagulating medium and preventing transverse shrinkage of the sheet by causing it to adhere to the support during coagulation.

3. The method of producing a sheet or film which comprises depositing a cellulose derivative solution in a continuous thin sheet on a support, coagulating the sheet by drawing it through a coagulating bath and preventing transverse shrinkage of the sheet by securing the marginal portions thereof to the support during coagulation.

4. The method of producing a sheet or film which comprises depositing a cellulose derivative solution in a continuous thin sheet on a support comprising a parallel means maintained in definite spaced relation, coagulating the sheet by drawing the support through a coagulating bath, and preventing transverse shrinkage of the sheet by causing the marginal portions thereof to adhere to the parallel supporting means during coagulation.

5. Apparatus for producing sheets or films which comprises a tank adapted for containing a bath of coagulating fluid, a hopper positioned adjacent the tank and having a slot-like opening therein for delivery of a viscous solution therefrom in the form of a sheet or film, and a plurality of supporting bands in the tank passing in definite parallel spaced relation directly under the slot-like opening of the hopper.

6. Apparatus for producing sheets or films which comprises a tank adapted for containing a bath of coagulating fluid, a hopper positioned adjacent the tank and having a slot-like opening therein for delivery of a viscous solution therefrom in the form of a sheet or film, two perforated supporting bands in the tank passing in definite parallel spaced relation directly under the slot-like opening of the hopper and meshing with sprocketed rolls positioned in the tank.

7. Apparatus for producing sheets or films which comprises a tank adapted for containing a bath of coagulating fluid, a hopper positioned adjacent the tank and having a slot-like opening therein for delivery of the viscous solution therefrom in the form of a sheet or film, rolls in the tank having sprockets on the ends thereof in definite spaced relation, and perforated bands passing through the hopper and the tank and meshing with the sprocketed rolls in the tank, the sprockets being so positioned that the bands are maintained in parallel relation.

HENRI EDOUARD RENARD.